United States Patent
Wolfe, IV et al.

(10) Patent No.: US 7,644,983 B2
(45) Date of Patent: Jan. 12, 2010

(54) EVAPORATIVELY PRE-COOLED SEAT ASSEMBLY

(75) Inventors: Edward Wolfe, IV, Amherst, NY (US); Prasad Shripad Kadle, Williamsville, NY (US); Ilya Reyzin, Williamsville, NY (US); Mohinder Singh Bhatti, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 11/975,291

(22) Filed: Oct. 18, 2007

(65) Prior Publication Data

US 2009/0102250 A1   Apr. 23, 2009

(51) Int. Cl.
*A47C 31/00* (2006.01)

(52) U.S. Cl. ............ 297/180.15; 297/180.13; 297/180.1

(58) Field of Classification Search ........... 297/180.13, 297/452.46, 452.49, 452.42, 180.15; 165/248; 62/304, 314, 24, 305
See application file for complete search history.

(56) References Cited

U.S. PATENT DOCUMENTS

| 4,779,924 | A | * | 10/1988 | Rudel ................. 297/195.13 |
| 5,002,336 | A | * | 3/1991 | Feher ................. 297/180.13 |
| 5,187,946 | A | * | 2/1993 | Rotenberg et al. ........... 62/314 |
| 5,301,518 | A | * | 4/1994 | Morozov et al. ............. 62/305 |
| 5,718,848 | A | * | 2/1998 | James ..................... 261/128 |
| 5,800,595 | A | * | 9/1998 | Wright ..................... 95/288 |
| 6,254,179 | B1 | * | 7/2001 | Kortum et al. ........... 297/180.12 |
| 6,338,258 | B1 | * | 1/2002 | Lee et al. ................. 62/310 |
| 6,871,365 | B2 | * | 3/2005 | Flick et al. ................. 5/421 |
| 7,093,452 | B2 | * | 8/2006 | Chee et al. ................. 62/175 |
| 7,213,876 | B2 | * | 5/2007 | Stoewe ................. 297/180.14 |
| 7,228,699 | B2 | * | 6/2007 | Gillen et al. ................. 62/314 |
| 7,425,034 | B2 | * | 9/2008 | Bajic et al. ............. 297/180.14 |
| 7,438,124 | B2 | * | 10/2008 | Bhatti et al. ................. 165/248 |
| 2002/0073718 | A1 | * | 6/2002 | Maisotsenko et al. ......... 62/121 |
| 2003/0197404 | A1 | * | 10/2003 | Ekern et al. ............ 297/180.11 |
| 2004/0189061 | A1 | * | 9/2004 | Hartwich et al. ........ 297/180.14 |
| 2005/0016197 | A1 | * | 1/2005 | Bourne et al. ................. 62/310 |
| 2005/0210907 | A1 | * | 9/2005 | Gillan et al. ................. 62/304 |
| 2007/0017241 | A1 | * | 1/2007 | Hyland et al. ................. 62/236 |
| 2008/0072614 | A1 | * | 3/2008 | Bhatti et al. ................. 62/305 |

* cited by examiner

*Primary Examiner*—David Dunn
*Assistant Examiner*—James Alex
(74) *Attorney, Agent, or Firm*—Patrick M. Griffin

(57) ABSTRACT

An evaporatively pre-cooled seat assembly comprising a seat cushion, an auxiliary cooler, and an evaporative cooler. The evaporative cooler includes a plurality of parallel tubular dry channels and a plurality of tubular wet channels. The dry channels and wet channels are arranged such that they alternate from dry channel to wet channel from channel to channel. Each of the channels is defined by two parallel side walls, a top, and a bottom. A first plurality of dry channels defines a plurality of apertures in the side walls thereof for conveying air out of the respective dry channel and into an adjacent wet channel. A second plurality of dry channels alternates with the first plurality and is disposed between two wet channels and defines a plurality of cooler apertures in the tops thereof for conveying cooled air out of the second plurality of alternating dry channels and to the auxiliary cooler.

10 Claims, 2 Drawing Sheets

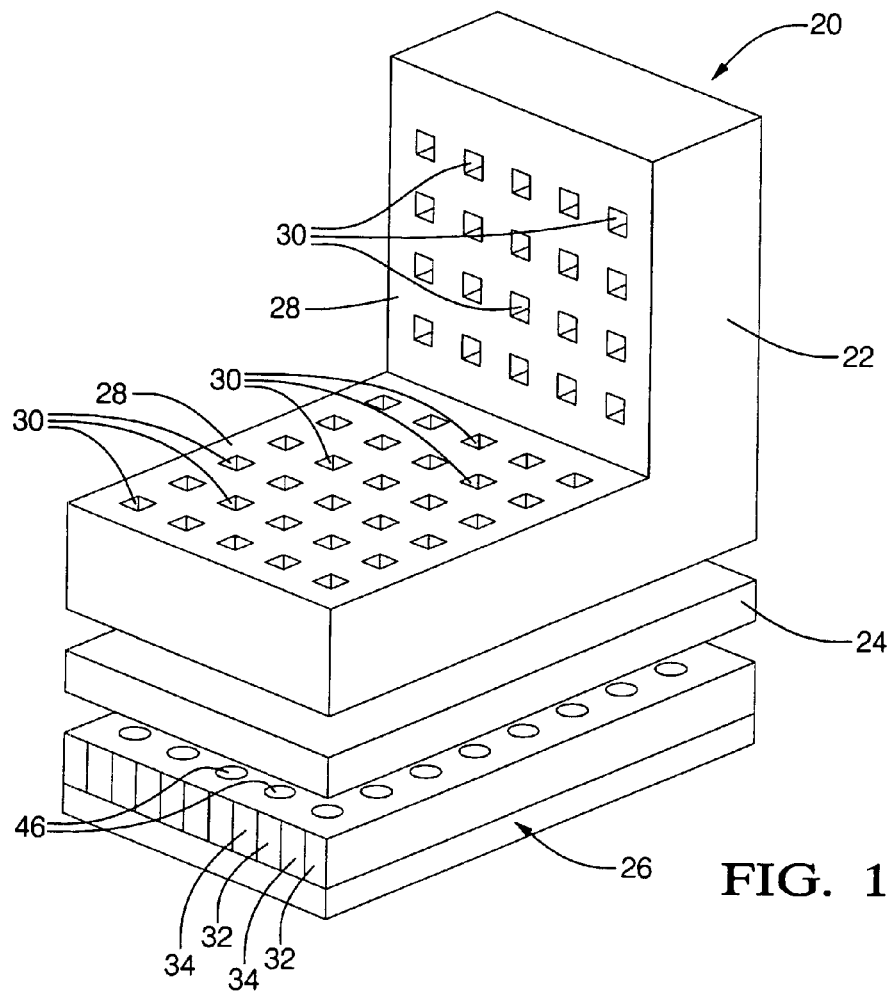
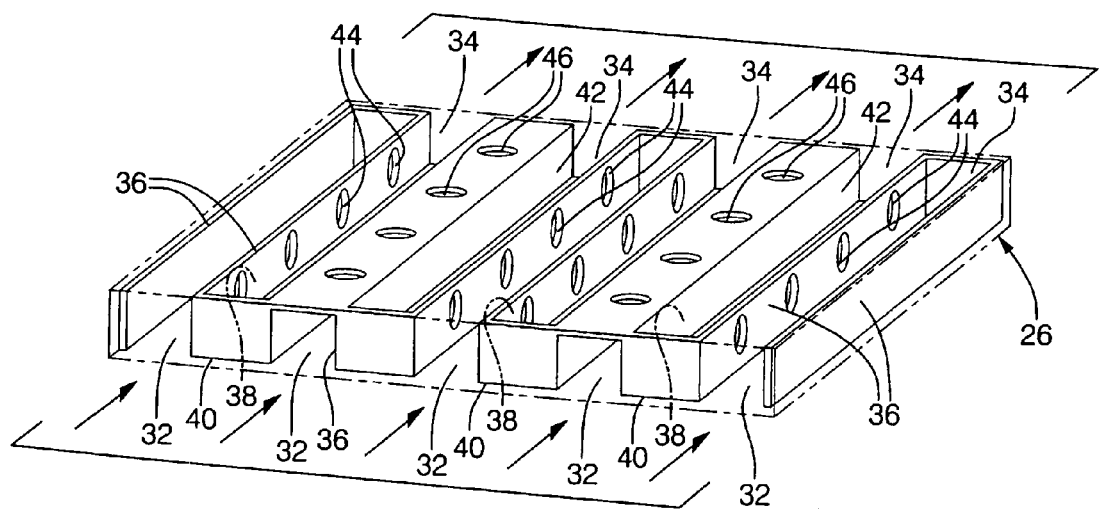

EVAPORATIVELY PRE-COOLED SEAT ASSEMBLY

BACKGROUND OF THE INVENTION

1. Field of the Invention

The present invention relates to an evaporatively pre-cooled seat assembly for supporting a passenger.

2. Description of the Prior Art

The comfort of a passenger and/or a driver inside a vehicle in a warm temperature environment is increased by cooling or air conditioning the interior of the vehicle. Current vehicles each have a primary vapor compression air conditioning system that delivers air that is cooled by the vehicle's Heating Ventilation Air Conditioning (HVAC) module. The primary air conditioning system is usually located behind the instrument panel. The primary air conditioning system utilizes ducts to convey the cooled air through the instrument panel and vents to deliver the cooled air from the ducts to the interior thereby cooling the entire passenger compartment. The cool air then circulates throughout the interior and cools the passenger. The cooling of the passenger is relatively slow because a significant amount of cool air is utilized to cool the surrounding thermal mass with only part of the cool air actually cooling the passenger.

The cooling rate associated with the passenger can be improved by placing the passenger in direct contact with the cool surfaces produced by the air conditioning system. One of the ways to accomplish this objective is to cool the seat in which the passenger sits. It is well known to flow cool air over a seat cushion to produce a cool seat surface. The cooling air can be supplied by the primary air conditioning system of the vehicle or by an auxiliary cooler such as a thermoelectric air conditioner embedded in the seat assembly. Such a seat assembly is disclosed in U.S. Pat. No. 5,002,336 to Feher and U.S. Pat. No. 7,238,101 to Kadle et al.

However, upon initial start-up, the conditioned air is incapable of providing quick comfort to the passenger as the conditioned air must first overcome the thermal inertia of the vehicle interior. Operating in series with the primary air conditioning system, the auxiliary cooler is designed to provide faster comfort to the passenger only upon its initial cool down and under steady state operation.

SUMMARY OF THE INVENTION AND ADVANTAGES

The invention provides an evaporative cooler in fluid communication with the auxiliary cooler to provide pre-cooled cool air to the auxiliary cooler. The evaporative cooler includes a plurality of parallel tubular dry channels and a plurality of tubular wet channels. Dry channels are open at the front end and closed at the rear end while the wet channels are closed at the front end and open at the rear end. The dry channels and wet channels are arranged such that they alternate from dry channel to wet channel from channel to channel. Each of the channels is defined by two parallel side walls, a top, and a bottom. The side walls of any particular channel separate that channel from the next channel.

A first plurality of dry channels defines a plurality of apertures in the side walls thereof for conveying air out of the respective dry channel and into an adjacent wet channel. In doing so, the air in the adjacent dry channels is cooled. A second plurality of dry channels alternates with the first plurality of dry channels and is disposed between two of the wet channels and defines a plurality of cooler apertures in the tops thereof for conveying the cooled air out of the respective dry channel and to the auxiliary cooler.

By utilizing the cooler apertures to instantaneously cool and then direct air out of the evaporative cooler, the subject invention allows the cool air from the cooler apertures to provide quick comfort to the passenger upon initial start-up without having to wait for the air conditioning system to achieve steady state operation.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of the invention;

FIG. 2 is a perspective view of the evaporative cooler; and

DETAILED DESCRIPTION OF THE INVENTION

Figure 3:
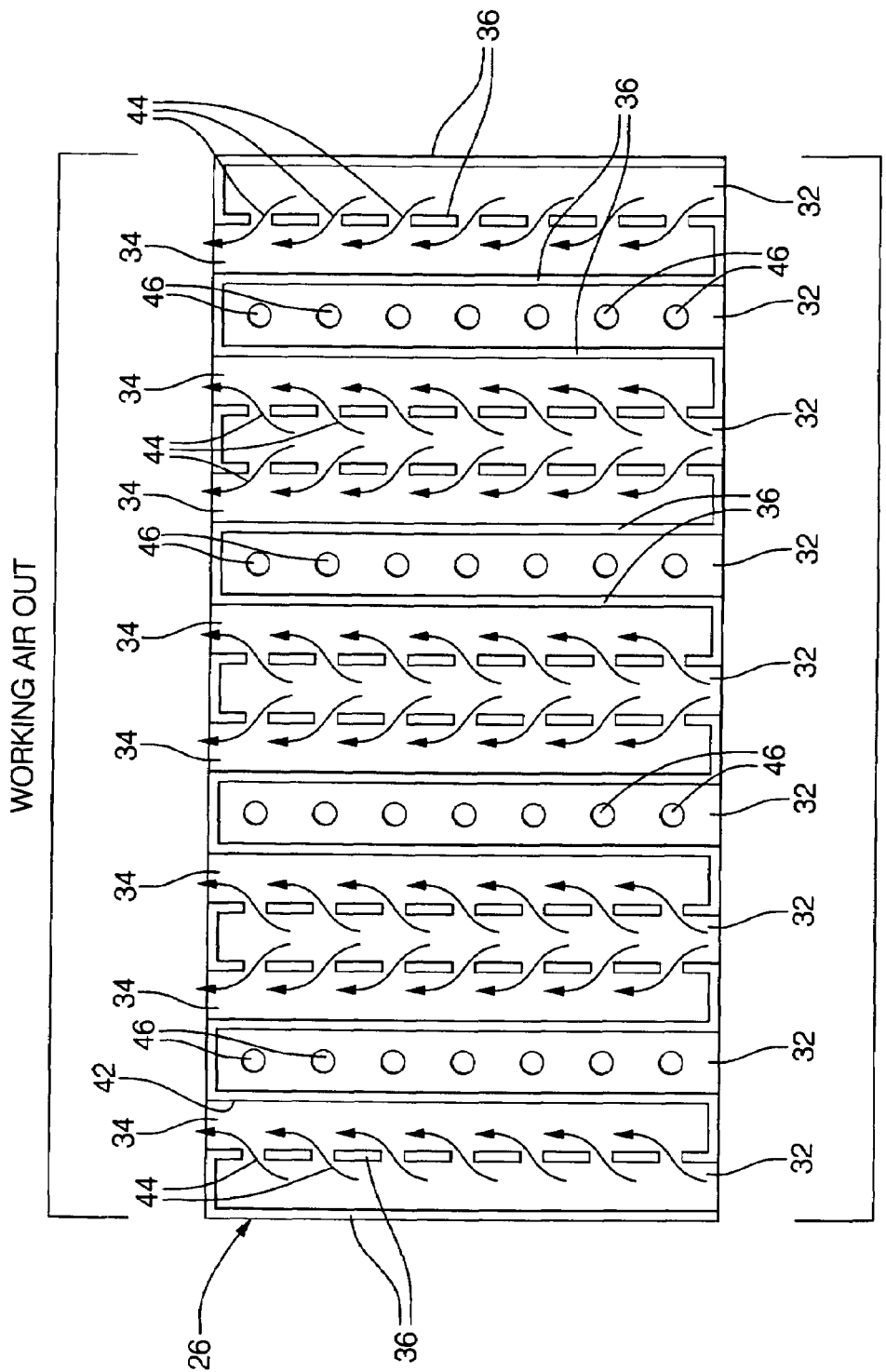
FIG. 3 is a top view also in cross section of the evaporative cooler.

Referring to the Figures, a seat assembly 20 is generally shown in FIG. 1. The seat assembly 20 comprises a seat cushion 22, an auxiliary cooler 24, and an evaporative cooler 26, which is generally indicated.

The seat cushion 22 supports a passenger sitting in the seat assembly 20. The seat cushion 22 of the preferred embodiment supports the lower portion of the body of the passenger as well as the back of the passenger. The seat cushion 22 has a seating surface 28. The seating surface 28 is the exterior of the seat cushion 22 with which the passenger has direct contact. The seat cushion 22 has a plurality of passages 30 extending inwardly from the seating surface 28 and into the seat cushion 22.

The auxiliary cooler 24 produces cooling air and then provides the cooling air to the passages 30 in the seat cushion 22. The passages 30 convey the cooling air through the seat cushion 22 and exit the cooling air over the seating surface 28 of the seat cushion 22. In doing so, the seating surface 28, and, consequently, the passenger are cooled. In the preferred embodiment, the auxiliary cooler 24 is a thermoelectric air conditioner embedded in the seat cushion 22. Alternatively, the auxiliary cooler 24 can be disposed outside of the seat cushion 22. In this case, duct work would be required to convey the cooling air from the auxiliary cooler 24 to the passages 30.

The evaporative cooler 26 receives ambient air, cools the ambient air to produce pre-cooled air, and then provides the pre-cooled air to the auxiliary cooler 24. In other words, the evaporative cooler 26 supplements the auxiliary cooler 24. The HVAC module of a vehicle typically includes a fan. The ambient air can be supplied by a separate fan which can be disposed under the seat cushion, or by the fan of the HVAC module of the vehicle. When supplied with pre-cooled air, the auxiliary cooler 24 produces cooling air that is lower in temperature than the cooling air produced from ambient air, i.e., without the evaporative cooler 26. As such, the inventive seat assembly 20 cools the passenger more quickly than a seat assembly 20 that does not employ such an evaporative cooler 26.

Additionally, the pre-cooled air supplied by the evaporative cooler 26 can cool the seating surface 28 before the auxiliary cooler 24 is activated. In this case, the fan would force the air through the functioning evaporative cooler 26, through the non-functioning auxiliary cooler 24, through the passages 30, and over the seating surface 28. The evaporative cooler 26 could be triggered by a remote device such as a timer or a key fob. Once the auxiliary cooler 24 is functional, i.e., the vehicle is running at steady state, the auxiliary cooler 24 would take over the seat cooling function.

The evaporative cooler 26 is disposed in close proximity to the auxiliary cooler 24 so as to minimize the loss of cooling capacity of the pre-cooled air as the pre-cooled air is conveyed from evaporative cooler 26 to the auxiliary cooler 24. In the preferred embodiment, the evaporative cooler 26 is embedded in the seat cushion 22 along with the auxiliary cooler 24. Additionally, in the preferred embodiment, the evaporative cooler 26 and the auxiliary cooler 24 are connected in series. As a result, the same fan can be used to force air through both coolers 24, 26, thus minimizing the amount of power needed to operate the system.

As shown in FIGS. 2 and 3, the evaporative cooler 26 includes a plurality of parallel tubular dry channels 32 and a plurality of tubular wet channels 34. Each of the channels 32, 34 is defined by two parallel side walls 36, a top 38, and a bottom 40. The side walls 36 of one of the channels 32, 34 separate it from the next. In other words, each of the channels 32, 34 shares a common side wall 36 with the next of the channels 32, 34. The tops 38 and bottoms 40 of each of the channels 32, 34 are independent of one another. Each of the channels 32, 34 begins with an open front end and an open rear end. Alternating dry channels 32 are closed at the rear end. The wet channels 34 between the alternating dry channels 32 are closed at the front end. Put another way, parallel dry channels 32 and wet channels 34 alternate from having an open front end and a closed rear end (dry channel 32) to having a closed front end and an open rear end (wet channel 34) from channel to channel.

Each of the wet channels 34 is lined with a wicking material 42. The wicking material 42 retains a liquid, which liquid can be supplied by a liquid source. As the primary air conditioning system operates, it generates water that collects in a condensate sump of the HVAC module. In one embodiment, the liquid retained in the wicking material can be the water collected in the condensate sump. In this case, the sump serves as the liquid source.

A first plurality of dry channels 32 defines a plurality of apertures 44 in the respective side walls 36 of each dry channel 32. The apertures 44 convey air out of the respective dry channel 32 and into at least one of the adjacent wet channels 34. In the preferred embodiment, the dry channels 32 of the first plurality convey air into two wet channels 34, which wet channels 34 are disposed on opposing sides of the respective dry channel 32.

A second plurality of dry channels 32 alternates with the first plurality of dry channels 32. Each of the dry channels 32 of the second plurality defines a plurality of cooler apertures 46 in the top 38 of the dry channel 32. The cooler apertures 46 convey cooled air out of the respective dry channels 32 and to the auxiliary cooler 24. The arrangement of the channels 32, 34 is such that there is a dry channel 32 with apertures 44 in the side walls 36, then a wet channel 34, then a dry channel 32 with cooler apertures 46 in the top 38, then another wet channel 34, then another dry channel 32 with apertures 44 in the side walls 36. This pattern can be repeated. Each dry channel 32 with cooler apertures 46 is disposed between two wet channels 34.

In this arrangement, incoming air flows from the fan or from the HVAC module and into the open front ends of all of the dry channels 32. The closed front ends of the wet channels 34 prevent air from entering. The incoming air flows into the alternating dry channels 32 with cooler apertures 46, i.e., the dry channels 32 without apertures 44 in the side walls 36. The air also flows into the dry channels 32 having apertures 44 in the side walls 36 and then into the wet channels 34 via the apertures 44 in the side walls 36. This is the only inlet for air into the wet channels 34. The air entering the wet channels 34 causes the water retained in the respective wicking material 42 to evaporate. In doing so, heat is extracted from the air in the adjacent dry channels 32, which dry channels 32 are the ones having cooler apertures 46, i.e., the dry channels 32 of the second plurality. As heat is extracted from the air of these dry channels 32, the temperature thereof is decreased. The cooled air is then conveyed out of the cooler apertures 46 and to the auxiliary cooler 24. The cooled air does not come into contact with the air of the wet channels 34 thereby preserving the original humidity of the incoming air. The air in the wet channels 34, which is saturated with water vapor, exits the open rear. This air can then be discharged from the passenger compartment of the vehicle. The conditioned cooled air flowing out of the apertures gets progressively cooler, from one aperture to the next aperture, from front to rear along the respective dry channel. As such, the air flowing out of the aperture at the rear of the dry channel is coldest.

Alternatively, the inventive evaporative cooler 26 can be housed in a portable seat pad and utilized independently of the auxiliary cooler 24.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An evaporatively pre-cooled seat assembly comprising; a seat cushion,
   an auxiliary cooler for providing cooling air to said seat cushion, an evaporative cooler in fluid communication with said auxiliary cooler for providing cooled cool air thereto,
   said evaporative cooler including a plurality of spaced and parallel side walls closed by a top and a bottom to define tubular channels with open front and rear ends,
   alternate of said channels being closed at said rear ends to define dry channels with said channels between said dry channels being closed at said front ends to define wet channels,
   a first plurality of said dry channels defining a plurality of apertures in said side walls thereof for conveying air out of said respective dry channel and into at least one adjacent wet channel to cool the air in said adjacent dry channels, and
   a second plurality of said dry channels alternating with said first plurality and disposed between two of said wet channels and defining a plurality of cooler apertures in said tops thereof for conveying cooled air out of said second plurality of alternating dry channels and to said auxiliary cooler,
   wherein said wet channels, said first plurality of dry channels, and said second plurality of dry channels are substantially parallel and coplanar.

2. An assembly as set forth in claim 1 wherein each of said wet channels are lined with a wicking material for retaining a liquid to be evaporated by the air conveyed by said apertures in said side walls of said dry channels to extract heat from said adjacent dry channels thereby cooling the air in said adjacent dry channels.

3. An assembly as set forth in claim 2 including a liquid source for supplying the liquid to said wicking material of each of said wet air channels.

4. An assembly as set forth in claim 1 wherein said seat cushion includes a seating surface having a plurality of passages extending from said surface and into said seat cushion for conveying air.

5. An assembly as set forth in claim 1 wherein said auxiliary cooler is embedded in said seat cushion for providing cooling air to said passages in said seat cushion to exit said cooling air over said surface of said seat cushion.

6. An assembly as set forth in claim 5 said evaporative cooler is embedded in said seat cushion and in fluid communication with said auxiliary cooler for providing pre-cooled air to said auxiliary cooler.

7. An evaporatively pre-cooled seat assembly comprising:
a seat cushion having a seating surface,
said seat cushion having a plurality of passages extending from said surface and into said seat cushion for conveying air,
an auxiliary cooler embedded in said seat cushion for providing cooling air to said passages in said seat cushion to exit said cooling air over said surface of said seat cushion,
an evaporative cooler embedded in said seat cushion and in fluid communication with said auxiliary cooler for providing pre-cooled air to said auxiliary cooler,
said evaporative cooler including a plurality of spaced and parallel side walls closed by a top and a bottom to define tubular channels with open front and rear ends,
alternate of said channels being closed at said rear ends to define dry channels with said channels between said dry channels being closed at said front ends to define wet channels,
each of said wet channels being lined with a wicking material for retaining a liquid,
a liquid source for supplying the liquid to said wicking material of each of said wet air channels,
a first plurality of said dry channels defining a plurality of apertures in said sidewalls thereof for conveying air out of said respective dry channel and into at least one adjacent wet channel to evaporate liquid from said wicking material to extract heat from the air in said adjacent dry channels thereby cooling the air in said adjacent dry channels, and
a second plurality of said dry channels alternating with said first plurality and disposed between two of said wet channels and defining a plurality of cooler apertures in said tops thereof for conveying cooled air out of said second plurality of alternating dry channels and to said auxiliary cooler;
wherein said wet channel, said first plurality of dry channels, and said second plurality of dry channels are substantially parallel and coplanar.

8. An evaporator assembly comprising;
an evaporative cooler for providing cooled air,
said evaporative cooler including a plurality of spaced and parallel side walls closed by a top and a bottom to define tubular channels with open front and rear ends,
alternate of said channels being closed at said rear ends to define dry channels with said channels between said dry channels being closed at said front ends to define wet channels,
a first plurality of said dry channels defining a plurality of apertures in said side walls thereof for conveying air out of said respective dry channel and into at least one adjacent wet channel to cool the air in said adjacent dry channels, and
a second plurality of said dry channels alternating with said first plurality and disposed between two of said wet channels and defining a plurality of cooler apertures in said tops thereof for conveying cooled air out of said second plurality of alternating dry channels;
wherein said wet channels, said first plurality of dry channels, and said second plurality of dry channels are substantially parallel and coplanar.

9. An assembly as set forth in claim 8 wherein each of said wet channels are lined with a wicking material for retaining a liquid to be evaporated by the air conveyed by said apertures in said side walls of said dry channels to extract heat from said adjacent dry channels thereby cooling the air in said adjacent dry channels.

10. An assembly as set forth in claim 9 including a liquid source for supplying the liquid to said wicking material of each of said wet air channels.

* * * * *